(12) United States Patent
Michl (10) Patent No.: US 12,363,014 B2
(45) Date of Patent: Jul. 15, 2025

(54) METHOD AND SYSTEM FOR DETERMINING A SIZE OF A BUFFER OF A DEVICE-UNDER-TEST

(71) Applicant: Rohde & Schwarz GmbH & Co. KG, Munich (DE)

(72) Inventor: Andreas Michl, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 414 days.

(21) Appl. No.: 18/054,033

(22) Filed: Nov. 9, 2022

(65) Prior Publication Data

US 2024/0154891 A1  May 9, 2024

(51) Int. Cl.
*H04L 43/0829* (2022.01)
*H04L 43/065* (2022.01)
*H04L 43/0894* (2022.01)
*H04L 43/50* (2022.01)

(52) U.S. Cl.
CPC ........ *H04L 43/0829* (2013.01); *H04L 43/065* (2013.01); *H04L 43/0894* (2013.01); *H04L 43/50* (2013.01)

(58) Field of Classification Search
None
See application file for complete search history.

(56) References Cited

U.S. PATENT DOCUMENTS

| | | | |
|---|---|---|---|
| 2003/0179719 A1* | 9/2003 | Kobayashi | H04L 47/43 370/282 |
| 2006/0140128 A1* | 6/2006 | Chi | H04L 43/50 370/389 |
| 2007/0168817 A1* | 7/2007 | Viens | G01R 31/31935 714/742 |

(Continued)

FOREIGN PATENT DOCUMENTS

| | | |
|---|---|---|
| EP | 1 652 087 B1 | 7/2015 |
| EP | 2 204 950 B1 | 3/2017 |

OTHER PUBLICATIONS

Geoff Huston, "Sizing the Buffer", APNIC, Dec. 10, 2019, total 12 pages, https://labs.apnic.net/?p=1279.

(Continued)

*Primary Examiner* — Xavier S Wong
(74) *Attorney, Agent, or Firm* — Studebaker Brackett PLLC (57) ABSTRACT

The present disclosure relates to a method for determining a size of a buffer of a device-under-test, DUT, which is transmitting data. The method comprises the steps of: transmitting a data stream with a transmitting bit rate by means of the DUT, wherein the data stream is loaded into the DUT buffer during said transmission; receiving the data stream with a receiving bit rate at a receiver device; detecting a difference between the transmitting bit rate and the receiving bit rate over time; monitoring a packet loss at the receiver side; detecting a time at which a packet error rate, PER, at the receiver side increases above a threshold based on the (Continued)

monitored packet loss; and calculating a size of the DUT buffer based on a difference between an amount of data transmitted by the DUT and an amount of data received by the receiver device from the start of the transmission until the detected time of the PER increase.

13 Claims, 7 Drawing Sheets

(56) References Cited

U.S. PATENT DOCUMENTS

| | | | | |
|---|---|---|---|---|
| 2012/0257535 | A1* | 10/2012 | DeWath | H04L 43/0876 370/253 |
| 2013/0188509 | A1* | 7/2013 | Mellein | H04B 17/0085 370/252 |
| 2016/0352611 | A1* | 12/2016 | Olgaard | H04L 43/50 |
| 2020/0008217 | A1* | 1/2020 | Shahar | H04W 28/0278 |
| 2020/0053825 | A1 | 2/2020 | Hwang et al. | |
| 2021/0250300 | A1* | 8/2021 | Mula | H04L 47/39 |

OTHER PUBLICATIONS

Gennadiy Linets et al., "The Regression Analysis of the Data to Determine the Buffer Size When Serving a Self-Similar Packets Flow", CEUR-WS.org, vol. 2842, 2020, http://ceur-ws.org/vol-2842/paper_7.pdf.

* cited by examiner

METHOD AND SYSTEM FOR DETERMINING A SIZE OF A BUFFER OF A DEVICE-UNDER-TEST

TECHNICAL FIELD

The disclosure relates to the detection of buffer sizes in a data communication chain. In particular, the disclosure relates to a method and a system for determining the size of a buffer of a device-under-test (DUT), both for the case that the DUT sends data and for the case that the DUT receives data.

BACKGROUND ART

Communication devices which are used to communicate data via a communication network typically comprise buffers (also called: data buffers) for temporarily storing communication data. In an IP based network, the buffers are required to transmit data from one endpoint to another endpoint in the network. Thereby, the buffers can be used to compensate for differences in processing speeds between different entities in the communication chain.

Knowledge about the exact size of these buffers is essential for optimizing data networks and, in particular, mobile communication devices in terms of latency.

For instance, on their way from a data source to a receiver, communication data typically passes through several processing nodes, wherein each processing node can have a buffer (or queue) of a different size. A high data load of this communication and a correlating high occupancy of the buffers may cause an increased latency of the communication. This can be particularly detrimental to 5G applications, such as uRLLC (ultra-reliable-low-latency) communication.

SUMMARY

Thus, there is a need to provide an improved method and an improved system for determining the buffer size of a communication device-under-test.

This is achieved by the embodiments provided in the enclosed independent claims. Advantageous implementations of the present disclosure are further defined in the dependent claims.

According to a first aspect, the present disclosure relates to a method for determining a size of a buffer of a device-under-test, DUT, which is transmitting data. The method comprises: transmitting a data stream with a transmitting bit rate by means of the DUT, wherein the data stream is loaded into the DUT buffer during said transmission; receiving the data stream with a receiving bit rate at a receiver device; detecting a difference between the transmitting bit rate and the receiving bit rate over time; monitoring a packet loss at the receiver side; detecting a time at which a packet error rate, PER, at the receiver side increases above a threshold based on the monitored packet loss; and calculating a size of the DUT buffer based on a difference between an amount of data transmitted by the DUT and an amount of data received by the receiver device from the start of the transmission until the detected time of the PER increase.

This achieves the advantage that the size of the buffer of a DUT, e.g. a communication device, can be determined efficiently based on a data transmission from the DUT.

The DUT can be a user equipment (UE) and/or a communication device, in particular a mobile communication device. The DUT can be a device capable of communication according to a 5G or 6G communication standard.

The receiver device can be a component of a test device or system, e.g. a system simulator and/or a network analyzer, used to test and/or analyze the DUT.

When carrying out the method according to the first aspect of the disclosure, a communication path or channel with certain characteristics, e.g. a specific guaranteed data transfer rate, can be established between the DUT and the receiver device, wherein the DUT is on a transmitter side and the receiver device is on a receiver side of this communication path or channel. The communication between DUT and receiver device can be carried out according to a communication protocol, such as 3G, 4G, 5G or 6G.

Here, the bit rate may refer to the bits that are conveyed or processed per unit of time (e.g., bits per second). The bit rate can be a measure of a data transfer rate.

In particular, the transmitting bit rate is the rate at which the DUT generates the data of the data stream, e.g. by means of a data generator. Thereby, the data generator can be provided respectively installed on the DUT, e.g. in the form of a dedicated application. The generated bit rate can be configurable at the generator end and hence allows to push data through the transmission buffers of the DUT at a defined rate (transmitting bit rate). The DUT can be configured to load the data of the data stream into the DUT buffer with this transmitting bit rate.

For instance, the receiving bit rate is the rate at which the receiving device receives the data stream. The receiving bitrate can be determined by an Iperf server, i.e. at the very end of the transmission chain. Previous receiver processing stages, such as the loading of the data stream into the receiver device buffers (rx buffers), might be still subject to packet loss. The receiving bit rate can be limited by a maximum channel capacity of a communication channel or path between the DUT and the receiver device which is determined by the channel capacity and potential interference, wherein this limited channel capacity can cause the DUT buffer to gradually fill up during a constant transmission of the data stream, because it is filled at a higher rate than it is emptied.

The amount of data transmitted by the DUT can refer to the amount of data generated and loaded into the DUT buffer during transmission. The amount of data received by the receiver device can refer to the amount of data received and loaded into the receiver device buffer during reception. At the receiver side, the amount of received data can be counted and subsequently discarded.

Both the DUT and the receiver device can comprise a buffer. Each buffer (or data buffer) can be a memory configured to temporarily store data in order to facilitate a communication to, from or via the devices. The size of a buffer preferably refers to the maximum amount of data that can be stored in the buffer. For instance, in a transmission device (such as the DUT in the above method) the buffer can store the data of the data stream prior and/or during its transmission to the receiver device. In the receiver device the buffer can temporarily store the received data during and/or after its reception. In particular, there can be many buffers at various levels of the OSI model that can contribute to the overall buffers of the DUT and the receiver device. For instance, the buffers of each device can comprise network socket buffers (TCP, UDP buffer) and/or stack related buffers like an RLC buffer. Here, the term "DUT buffer" may refer to the sum of all buffers on the transmitter process chain (i.e., the DUT buffers when the DUT is used as transmitter), and the term "receiver device buffer" may refer to all buffers on the receiver process chain (i.e., the receiver device buffers).

Hence, the method can be used to determine a total size of all involved buffers at the DUT side.

The DUT buffers can form transmit buffers and the receiver device buffers can form receive buffers. For instance, during transmission, transmission data that is generated by the DUT is successively loaded into the DUT buffers. The data can then be transferred from the DUT buffers via the physical communication channel to the receiver device. During reception by the receiver device, the received data can be successively loaded into the receiver device buffer.

The packet loss can be determined with a suitable method, such as an Iperf UDP measurement. When performing an Iperf measurement a throughput of a data stream according to the User Datagram Protocol (UDP) between a transmitter and receiver instance (here: DUT and receiver device) is measured. Thereby, parameters such as packet loss and bandwidth can be determined.

The filling of the DUT buffer causes the detectable increase of the PER. The increase of the PER over the threshold can indicate that the DUT buffer is substantially full. The increase of the PER can be detected by an increase of the monitored packet loss on the receiver side, e.g. in an Iperf server application.

Preferably, the buffer of the receiver device and/or the read out rate of data from the buffer of the receiver device are large enough such that the buffer of the receiver device is not completely filled when carrying out said method and does not contribute to the increase of the PER. In particular, the buffer size and/or a current buffer occupancy of the receiver device are known when carrying out the method.

The PER can be the number of error packets, in particular after Forward Error Correction (FEC), divided by the total number of emitted packets. The PER can be determined based on the detected packet loss. The threshold can be a predefined value. For instance, the threshold can be 1%, 2%, 5% or 10% above an average PER at the beginning of the transmission.

In an embodiment, the receiver device comprises a buffer, wherein the data stream is loaded into the buffer of the receiver device during reception; wherein the size of the DUT buffer is calculated by: calculating an integral of the difference between the transmitting bit rate and the receiving bit rate from the start of the transmission until the detected time of the PER increase, and subtracting an occupancy of the receiver device buffer at the time of the PER increase from said integral of the difference between the transmitting and receiving bit rate.

The integral of the difference between the transmitting and receiving bit rate can be an integral over time which integrates the amount of data transmitted minus the amount of data received from the start of the transmission until the time of the PER increase.

The occupancy of the buffer may refer to the amount of data stored in the buffer, i.e. the buffer usage. The occupancy of the receiver device buffer can be known, as the receiver device can be a part of a test system or test device used to analyze the DUT.

In an embodiment, the size of the DUT buffer is further calculated by additionally subtracting a data volume of a total packet loss during said time interval from said integral of the difference between the transmitting and receiving bit rate.

The data volume of the total packet loss can be calculated based on a time integral of the monitored packet loss. In particular, the data volume of the total packet loss is the product of the number of lost packets from the start of the transmission until the detected time of the PER increase and the respective packet sizes.

In an embodiment, the method comprises the further step of: emptying the DUT buffer and/or a buffer of the receiver device before initiating the transmission of the data stream.

In an embodiment, a maximum data transfer rate of a communication channel between the DUT and the receiver device is determined prior to the step of transmitting the data stream by means of the DUT. This is, for example, done by an Iperf TCP measurement.

In an embodiment, said determination of the maximum data transfer rate of the communication channel comprises: transmitting a training data stream from the DUT to the receiver device, wherein a transmitting bit rate of the training data stream is equal or higher than the maximum receiving bit rate of the receiver device.

In an embodiment, after the determination of the maximum data transfer rate of the communication channel, the following steps are carried out: emptying the DUT buffer and/or a buffer of the receiver device; and subsequently transmitting a data packet with a specific signature from the DUT to the receiver device to test a successful buffer emptying. For instance, if the packet with the signature is received, it can be assumed that the buffers are cleared.

According to a second aspect, the disclosure relates to a method for determining a size of a buffer of a device-under-test, DUT, which is receiving data. The method comprises: transmitting a data stream with a transmitting bit rate by means of a transmission device; receiving the data stream with a receiving bit rate at the DUT, wherein the received data stream is loaded into the DUT buffer, said buffer being emptied by the DUT at a lower rate than the receiving bit rate such that the DUT buffer fills up over time; detecting a difference between the transmitting bit rate and the receiving bit rate over time; monitoring a packet loss at the receiver side; detecting a time at which a packet error rate, PER, at the receiver side increases above a threshold based on the monitored packet loss; and calculating a size of the DUT buffer based on a difference between an amount of data transmitted by the transmission device and an amount of data received by the DUT from the start of the transmission until the detected time of the PER increase.

This achieves the advantage that the size of the buffer of the DUT can be determined efficiently based on a data transmission to the DUT.

Preferably, the transmitting bit rate is lower than a maximum data transfer rate (i.e., throughput) of a communication path or channel between the transmission device and the DUT. For example, this achieves the advantage that the buffer of the transmission device is not filled up by a data queue due to a low channel capacity.

The DUT can be identical to the DUT used in the method according to the first aspect of the disclosure. The transmitter device can be a component of a test device or system, e.g. a system simulator and/or a network analyzer, used to test and/or analyze the DUT. In particular, the test system can comprise both the transmitter device and the receiver device.

Both the DUT and the transmitter device can comprise a buffer, wherein, when carrying out the method according to the second aspect of the disclosure, the DUT buffer can form a receive buffer and the transmitter device buffer can form a transmit buffer. Here, the term "DUT buffer" may refer to the sum of all buffers on the receiver process chain (i.e., the DUT buffers when the DUT is used as receiver), and the term "transceiver device buffer" may refer to the sum of all buffers on the transmitter process chain (i.e., the transmitter device buffers).

In an embodiment, the transmitter device comprises a buffer, wherein the data stream is loaded into the buffer of the transmission device during transmission; wherein the size of the DUT buffer is calculated by: calculating an integral of the difference between the transmitting bit rate and the receiving bit rate from the start of the transmission until the detected time of the PER increase, and subtracting an occupancy of the transmission device buffer at the time of the PER increase from said integral of the difference between the transmitting and receiving bit rate.

In an embodiment, the size of the DUT buffer is further calculated by: additionally subtracting a data volume of a total packet loss during said time interval from said integral of the difference between the transmitting and receiving bit rate.

In an embodiment, the method comprises the further step of: emptying the DUT buffer and/or a buffer of the transmitter device before initiating the transmission of the data stream.

In an embodiment, a maximum data transfer rate of a communication channel between the DUT and the transmission device is determined prior to the step of transmitting the data stream by means of the transmission device. This is, for example, done by an Iperf TCP measurement.

In an embodiment, said determination of the maximum data transfer rate of the communication channel comprises: transmitting a training data stream from the transmission device to the DUT, wherein a transmitting bit rate of the training data stream is significantly equal or higher than the maximum receiving bit rate of the DUT.

In an embodiment, after the determination of the maximum data transfer rate of the communication channel, the following steps are carried out: emptying the DUT buffer and/or a buffer of the transmission device; and subsequently transmitting a data packet with a specific signature from the transmission device to the DUT to test a successful buffer emptying. For instance, if the packet with the signature is received, it can be assumed that the buffers are cleared.

Apart from the swapping of the transmitter and the receiver, the above description with regard to the method according to the first aspect of the disclosure is correspondingly valid for the method according to the second aspect of the disclosure.

According to a third aspect, the disclosure relates to a system for determining a size of a buffer of a DUT. The system comprises: a transceiver device configured to establish a communication connection to the DUT; wherein the transceiver device is configured to transmit a data stream to be received by the DUT or to receive a data stream that was transmitted by the DUT; wherein, in each case, the data stream is transmitted with a transmitting bit rate and received with a receiving bit rate; and wherein the data stream is loaded into the DUT buffer during reception respectively during transmission by the DUT. The system further comprises a control device which is configured to detect a difference between the transmitting bit rate and the receiving bit rate over time; wherein the control device is configured to monitor a packet loss at the receiver side, and to detect a time at which a packet error rate, PER, at the receiver side increases above a threshold based on the monitored packet loss; and wherein the control device is further configured to calculate the size of the DUT buffer based on a difference between an amount of data transmitted by the DUT respectively the transceiver device and an amount of data received by the transceiver device respectively the DUT from the start of the transmission until the detected time of the PER increase.

The transceiver device can comprise a transmitter device for transmitting the data stream to the DUT and/or a receiver device for receiving the data stream from the DUT.

In particular, if the DUT is receiving data from the transceiver device, the DUT buffer is emptied (i.e., read out) by the DUT at a lower rate than the receiving bit rate such that the DUT buffer fills up over time. At the same time, the transmitting bit rate of the transceiver device can be lower than a maximum data transfer rate of a communication path or channel between the transceiver device and the DUT to avoid the buffer of the transceiver device to fill up due to a low channel capacity.

In an embodiment, the transceiver device comprises a transmit and a receive buffer, wherein the data stream is loaded into the transmit buffer during transmission respectively into the receive buffer during reception by the transceiver device; wherein the control device is configured to calculate the size of the DUT buffer by: calculating an integral of the difference between the transmitting bit rate and the receiving bit rate from the start of the transmission until the detected time of the PER increase, and subtracting an occupancy of the transmit respectively receive buffer of the transceiver device at the time of the PER increase from said integral of the difference between the transmitting and receiving bit rate.

In an embodiment, the control device is further configured to calculate the size of the DUT buffer by additionally subtracting a data volume of a total packet loss during said time interval from said integral of the difference between the transmitting and receiving bit rate.

The above description with regard to the methods according to the first and second aspects of the disclosure is correspondingly valid for the system according to the third aspect of the disclosure.

BRIEF DESCRIPTION OF THE DRAWINGS

The above-described aspects and implementation forms of the present disclosure will be explained in the following description of specific embodiments in relation to the enclosed drawings, in which.

DETAILED DESCRIPTIONS OF EMBODIMENTS

Figure 1:
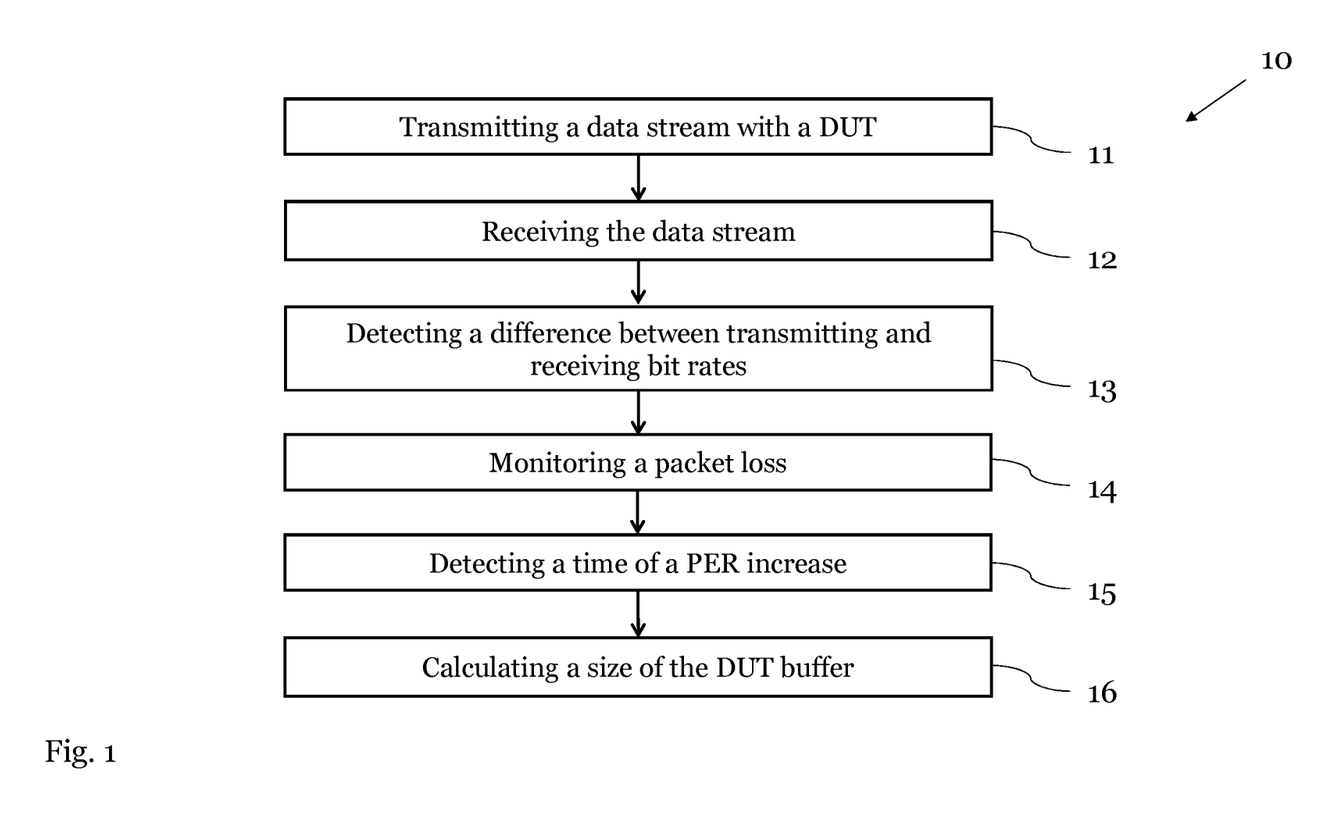
FIG. 1 shows a flow diagram of a method for determining a size of a buffer of a DUT which is transmitting data according to an embodiment.

FIG. 1 shows a flow diagram of a method 10 for determining a size of a buffer of a DUT which is used for transmitting data according to an embodiment.

The method 10 comprises the steps of: transmitting 11 a data stream with a transmitting bit rate by means of the DUT, wherein the data stream is loaded into the DUT buffer during said transmission; receiving 12 the data stream with a receiving bit rate at a receiver device; detecting 13 a difference between the transmitting bit rate and the receiving bit rate over time; monitoring 14 a packet loss at the receiver side; detecting 15 a time at which a packet error rate, PER, at the receiver side increases above a threshold based on the monitored packet loss; and calculating 16 a size of the DUT buffer based on a difference between an amount of data transmitted by the DUT and an amount of data received by the receiver device from the start of the transmission until the detected time of the PER increase.

Thereby, the DUT buffer size can be calculated 16 by calculating an integral of the difference between the transmitting bit rate and the receiving bit rate from the start of the transmission until the detected time of the PER increase, and subtracting an occupancy of a receiver device buffer at the time of the PER increase from said integral of the difference between the transmitting and receiving bit rate. From the results of this calculation, the data volume of a total packet loss during said time interval can be subtracted. In this way, statistical packet loss related to bad channel conditions or interference is removed from the calculated DUT buffer size value.

Figure 2:
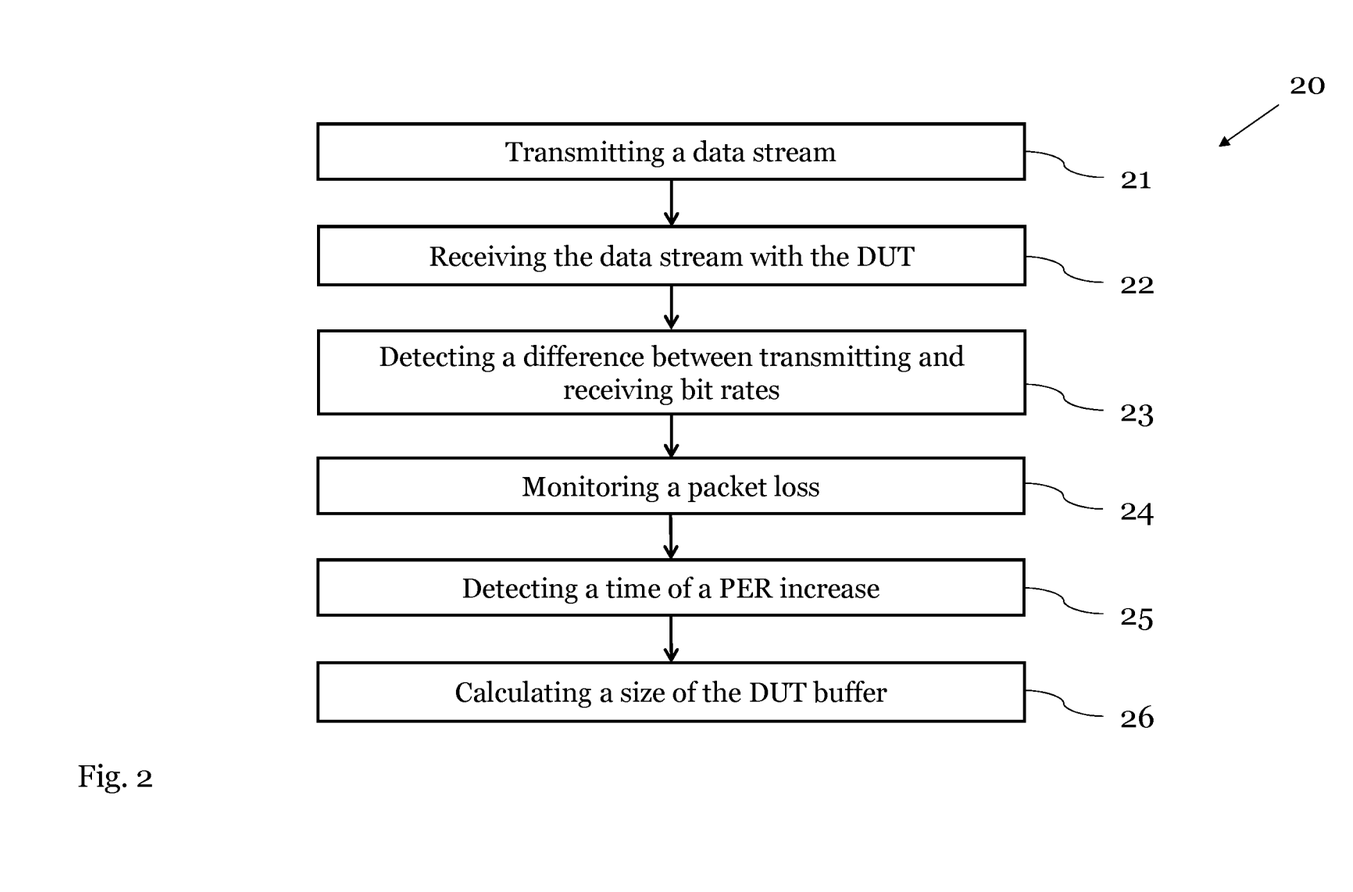
FIG. 2 shows a flow diagram of a method for determining a size of a buffer of a DUT which is receiving data according to an embodiment.

FIG. 2 shows a flow diagram of a method 20 for determining a size of a buffer of a DUT which is used for receiving data according to an embodiment.

The method 20 comprises the steps of: transmitting 21 a data stream with a transmitting bit rate by means of a transmission device; receiving 22 the data stream with a receiving bit rate at the DUT, wherein the received data stream is loaded into the DUT buffer, said buffer being emptied by the DUT at a lower rate than the receiving bit rate such that the DUT buffer fills up over time; detecting 23 a difference between the transmitting bit rate and the receiving bit rate over time; monitoring 24 a packet loss at the receiver side; detecting 25 a time at which a packet error rate, PER, at the receiver side increases above a threshold based on the monitored packet loss; and calculating 26 a size of the DUT buffer based on a difference between an amount of data transmitted by the transmission device and an amount of data received by the DUT from the start of the transmission until the detected time of the PER increase.

Hereby, the transmitting bit rate of the transceiver device is preferably lower than a maximum data transfer rate of a communication path or channel between the transceiver device and the DUT to avoid the buffer of the transceiver device to fill up due to a low channel capacity.

Similarly to the method 10, the DUT buffer size in according to method 20 can be calculated 26 by: calculating an integral of the difference between the transmitting bit rate and the receiving bit rate from the start of the transmission until the detected time of the PER increase, and subtracting an occupancy of a transmission device buffer at the time of the PER increase from said integral of the difference between the transmitting and receiving bit rate. From the results of this calculation, the data volume of a total packet loss during said time interval can be subtracted.

Thus, both methods 10, 20 are essentially similar and are based on the fact that the data that is stored in the buffers of a transmitter device and a receiver device which are communicating with each other depends on a delta (i.e., a difference) between the amount of data which is transmitted by the transmitter and the amount of data that is received by the receiver minus the data that is lost during said transmission. The PER starts to increase when either the buffer of the transmitter (the DUT in method 10) or the receiver (the DUT in method 20) is filled, i.e., the DUT buffer memory is completely occupied. Subtracting the known occupancy of the buffer of the corresponding receiver device in method 10 respectively the transmitter device in method 20 at that time from the total amount of data stored in the buffers gives the buffer size of the respective DUT buffer.

In particular, in both methods 10, 20 the buffer of the DUT fills up first and is responsible for the increase of the PER. In the method 20 this is achieved by the DUT buffer being emptied (i.e., read out) at a lower rate than the rate at which it is filled.

In each case, the DUT can be a user equipment (UE) and/or a communication device, in particular a mobile communication device. The DUT can be a device capable of communication according to a 5G or 6G communication standard.

The respective receiver device and/or the transmitter device which receives data from respective transmits data to the DUT can be components of a test device or system, e.g. a system simulator and/or a network analyzer, for testing and/or analyzing DUTs. The receiver device and/or the transmitter device can each comprise its own buffer to temporarily store received data respectively data to be transmitted. The occupancy of said buffers at any time can be known.

The buffer of each of the devices (DUT, transmitter device, receiver device) may comprise a plurality of memory instances or a single memory of the device.

In particular, detecting a difference between the transmitting bit rate and the receiving bit rate over time (steps 13, 23) may refer to monitoring the transmitting bit rate and the receiving bit rate over time and subtracting the thus monitored time dependent parameters from each other.

When carrying out the methods 10, 20, a communication path or channel with certain characteristics, e.g. a specific guaranteed data transfer rate, can be established between the DUT and the receiver respectively transmitter device. The communication between DUT and receiver respectively transmitter device can be carried out according to a communication protocol, such as 3G, 4G, 5G or 6G. In particular, the communication can be a wireless communication.

In both methods 10, 20, the packet loss on the receiver side can be determined with a suitable method, such as an Iperf UDP measurement.

Furthermore, in both methods 10, 20 the PER threshold can be a respective predefined value. For instance, the threshold can be 1%, 2%, 5% or 10% above an average PER at the beginning of the transmission.

In addition, each method 10, 20 may comprise the step of: emptying the DUT buffer and/or a buffer of the receiver respectively transmitter device. This step can be carried out prior to initiating the transmission 11, 21 of the data stream. Notably, this step can also be carried out as part of a training phase shown in FIG. 3 (step 33).

Figure 3:
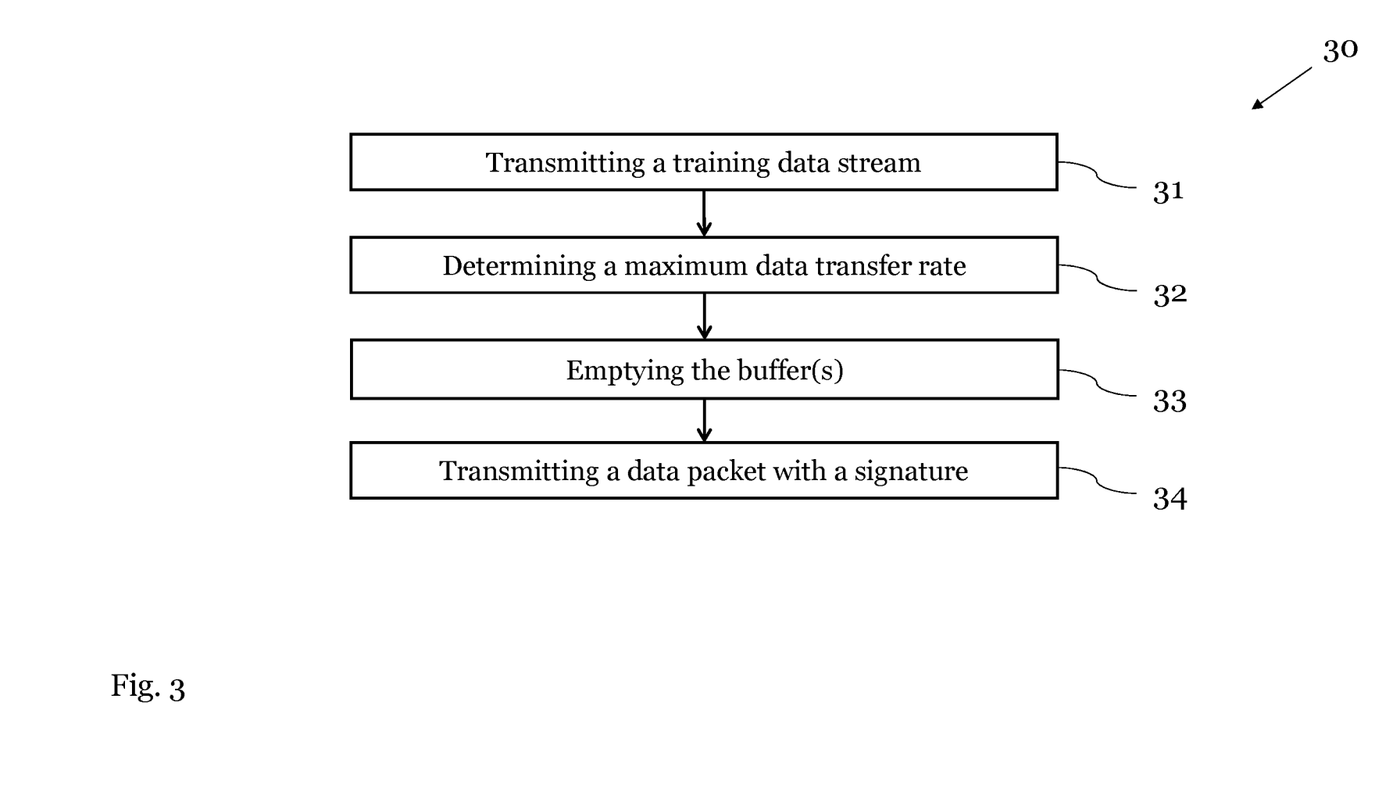
FIG. 3 shows a flow diagram of a method for characterizing a communication channel according to an embodiment.

FIG. 3 shows a flow diagram of a method 30 for characterizing a communication channel according to an embodiment. The steps of the method 30 shown in FIG. 3 can be carried out prior to the steps of the methods 10 and 20 shown in FIGS. 1 and 2.

The method 30 comprises the steps of: transmitting 31 a training data stream from the DUT to the receiver device or from the transmitting device to the DUT via the communication channel, wherein a transmitting bit rate of the training data stream is equal or higher than the maximum receiving bit rate of the receiver device respectively the DUT at the receiver side; and determining 32 a maximum data transfer rate of the communication channel based on said transmission. For instance, the maximum data transfer rate can be determined 32 using an Iperf TCP measurement. In particular, the transmitting bit rate of the training data stream being significantly larger than the receiving bit rate preferably causes the buffer on the transmission side of the communication channel to be filled up. For instance, the transmitting bit rate can be more than 10%, 20%, 50% or 100% larger than the receiving bit rate.

The method 30 shown in FIG. 3 comprises the further steps of: emptying 33 the buffers of the DUT and the transmission device respectively receiver device, e.g. by waiting until all data of the training data stream are received on the receiver side; and subsequently transmitting 34 a data packet with a specific signature from the transmission device to the DUT to test a successful buffer emptying. As soon as the data packet with the signature is received, it can be assumed that the buffer(s) are cleared.

Figure 4:
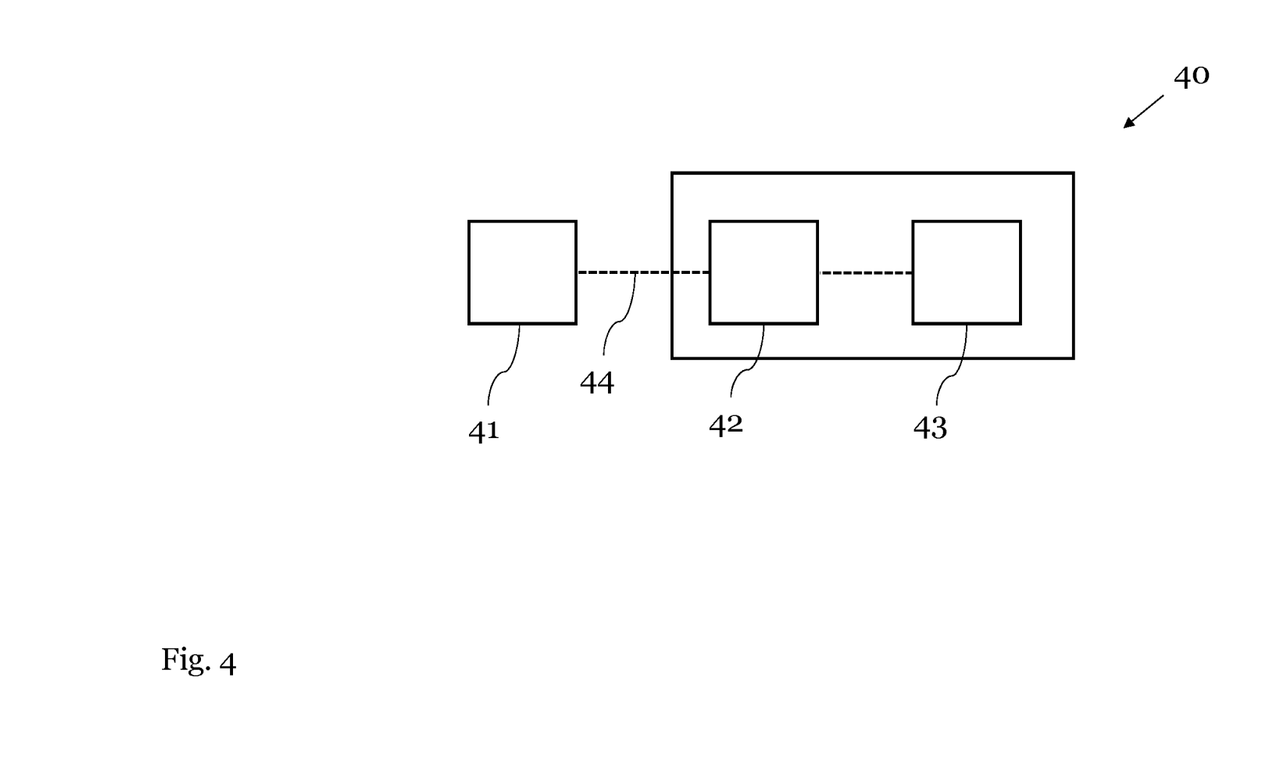
FIG. 4 shows a schematic diagram of a system for determining a size of a buffer of a DUT according to an embodiment.

FIG. 4 shows a schematic diagram of a system 40 for determining a size of a buffer of a DUT 41 according to an embodiment.

The system 40 comprises: a transceiver device 42 configured to establish a communication connection to the DUT 41; wherein the transceiver device 42 is configured to transmit a data stream to be received by the DUT 41 or to receive a data stream that was transmitted by the DUT 41; wherein, in each case, the data stream is transmitted with a transmitting bit rate and received with a receiving bit rate; and wherein the data stream is loaded into the DUT buffer during reception respectively during transmission by the DUT 41. The system 40 further comprises a control device 43 which is configured to detect a difference between the transmitting bit rate and the receiving bit rate over time; wherein the control device 43 is configured to monitor a packet loss at the receiver side, and to detect a time at which a packet error rate, PER, at the receiver side increases above a threshold based on the monitored packet loss; and wherein the control device 43 is further configured to calculate the size of the DUT buffer based on a difference between an amount of data transmitted by the DUT 41 respectively the transceiver device 42 and an amount of data received by the transceiver device 42 respectively the DUT 41 from the start of the transmission until the detected time of the PER increase.

Preferably, the transceiver device 42 comprises a buffer, wherein the data stream is loaded into the buffer of the transceiver device 42 during transmission respectively during reception by the transceiver device 42. In particular, the buffer of the transceiver device can comprise a receive buffer and a transmit buffer, wherein data is loaded into the transmit buffer during transmission and into the receive buffer during reception. The transmit and receive buffer can be different physical buffers (i.e., formed by different physical memories) of the device 42. Alternatively, the transmit and receive buffer could also be instances of a single physical memory of the device 42. The transceiver device 42 can comprise a plurality of transmit buffers (here collectively referred to as transmit buffer) and a plurality of receive buffers (here collectively referred to as transmit buffer).

The control device 43 can be configured to calculate the size of the DUT buffer by: calculating an integral of the difference between the transmitting bit rate and the receiving bit rate from the start of the transmission until the detected time of the PER increase, and subtracting an occupancy of the transceiver device buffer at the time of the PER increase from said integral of the difference between the transmitting and receiving bit rate. The control device 43 can be configured to additionally subtract a data volume of a total packet loss during said time interval from the results of said calculation.

Preferably, the system 40 can carry out any one of the methods 10, 20, 30 as shown in FIGS. 1-3. The transceiver device 42 can comprise a transmitter device for transmitting a data stream to the DUT 41 and a receiver device for receiving the data stream from the DUT 41, depending on which method 10 or 20 is carried out. The buffer of the transceiver device 42 can form a buffer of the receiver device (receive buffer) and of the transmitter device (transmit buffer), depending on its current use.

In particular, if the DUT 41 is used for receiving data from the transceiver device 42, the DUT buffer is emptied (i.e., read out) by the DUT 41 at a lower rate than the receiving bit rate such that the DUT buffer fills up over time.

The system 40 can be a test system, e.g. a system simulator and/or a network analyzer, for testing and/or analyzing DUTs. The DUT 41 can be a user equipment and/or a communication device, in particular a wireless communication device.

The transceiver device 42 can comprise an interface, in particular a wireless interface, for establishing the communication connection 44 to the DUT 41. The communication connection 44 can comprise a communication channel, in particular a physical communication channel between the DUT 41 and the transceiver device 42. The communication connection 44 can be a wireless communication connection.

The control device 43 can comprise a processing unit, e.g. a microprocessor. The control device 43 can be implemented in hardware and/or software. Preferably, the control device 43 is configured to communicate with both the transceiver device 42 and the DUT 41 in order to determine the transmitting and receiving bit rates, the packet loss and the PER increase. For instance, the control device 43 or the transceiver device 42 can be configured to perform an Iperf UDP measurement in order to determine the packet loss. Furthermore, the transceiver device 42 can forward information on its buffer occupancy to the control device 43.

Furthermore, the DUT 41 can be capable of reporting a received data rate and/or a packet loss rate back to the transceiver device 42. In addition or alternatively, the DUT 41 can make this information available to the control device 43 for further processing.

Figure 5:
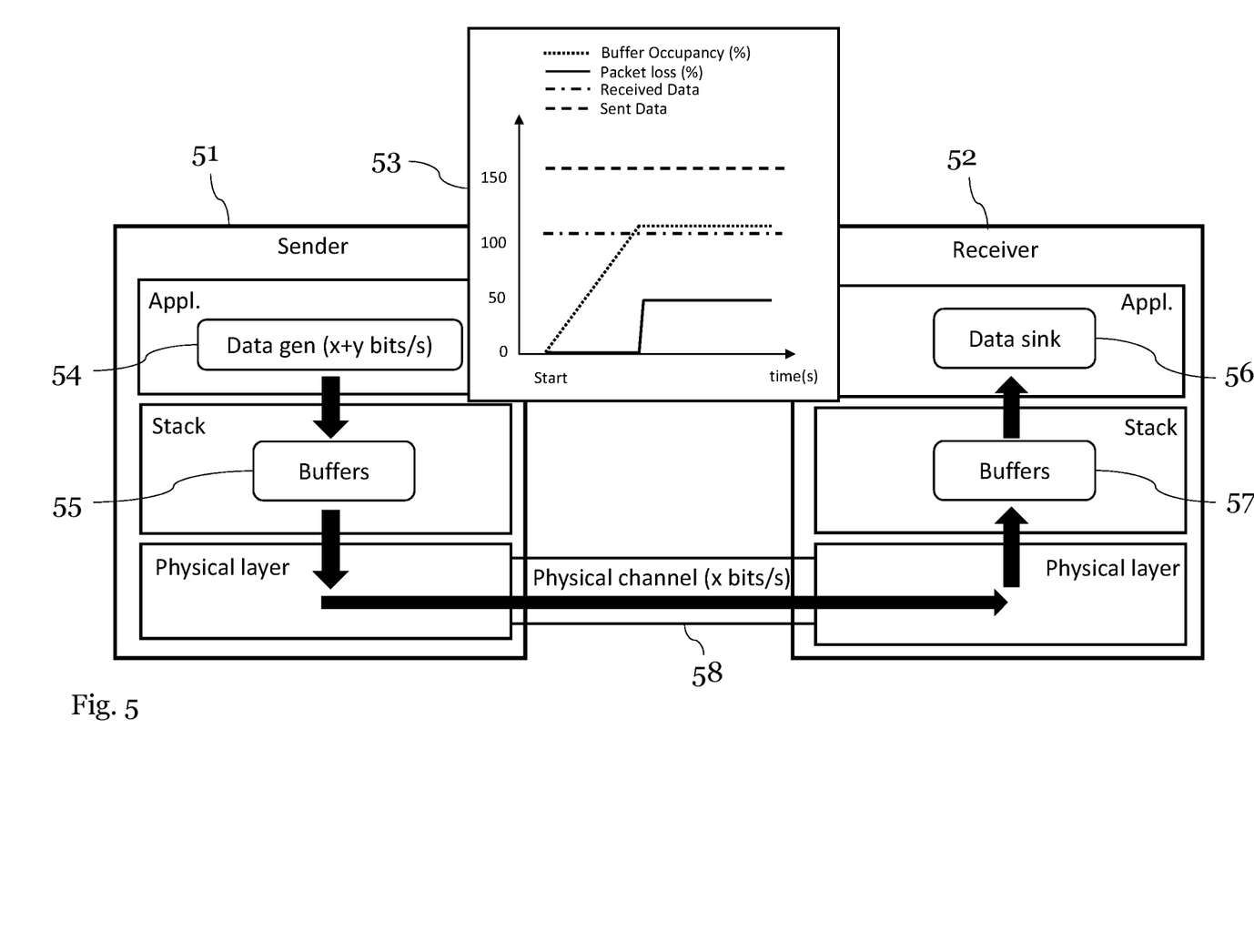
FIG. 5 shows a schematic diagram of a data transmission from a transmitter instance to a receiver instance according an embodiment.

FIG. 5 shows a schematic diagram of a data transmission from a transmitter instance 51 to a receiver instance 52 according an embodiment. For instance, when carrying out the method 10 as shown in FIG. 1, the transmitter instance 51 is the DUT and the receiver instance is the receiver device, and when carrying out the method 20 as shown in FIG. 2, the receiver instance 52 is the DUT and the transmitter instance 51 is the transmitter device. In the methods 10 and 20, a data transmission, as shown in FIG. 5, can be used to determine the buffer size of the transmitter 51 respectively the receiver instance 52.

As shown in FIG. 5, the transmitter and receiver instances 51, 52 connected via a physical data transmission medium 58, e.g. a physical communication channel with a data transmission capacity of x bits/s. The transmitter instance 51 comprises a data generator 54 which is arranged to transmit data with a higher bit rate, e.g. (x+y) bits/s. The receiver instance 52 comprises a data sink 56 which can determine both the amount of data received as well as the amount of data that was lost (packet loss) during a transmission. The packet loss can be determined by a known method, e.g. an Iperf UDP measurement.

The diagram 53 in FIG. 5 shows the occupancy of the buffers 55, 57 of the transmitter and receiver instance 51, 52, the packet loss and the received and sent (i.e., transmitted) data over time. Despite a significant overload of the communication channel 58, the packet loss only increases after a certain amount of time has passed. Prior to this packet loss increase, the occupancy of the buffer 55 on the transmitter side or of the buffer 57 on the receiver side increases until the buffer memory is full. The increase of the total occupancy of both buffers 55, 57 thereby corresponds to y bits/s, minus the data volume that is lost due to packet losses.

In order to determine the size of either the buffer 55 on the transmitter side or of the buffer 57 on the receiver side, the buffer occupancy of the respective other buffer can be subtracted from the total buffer occupancy. In this way, either the transmitter instance 51 or the receiver instance 52 can be investigated regarding a potentially incorrectly dimensioned buffer. For instance, the other buffer (with known occupancy and size) can be a buffer of a test system, e.g. a system simulator, while the buffer that is investigated is a buffer of a DUT which is tested and/or analyzed by the test system.

Figure 6:
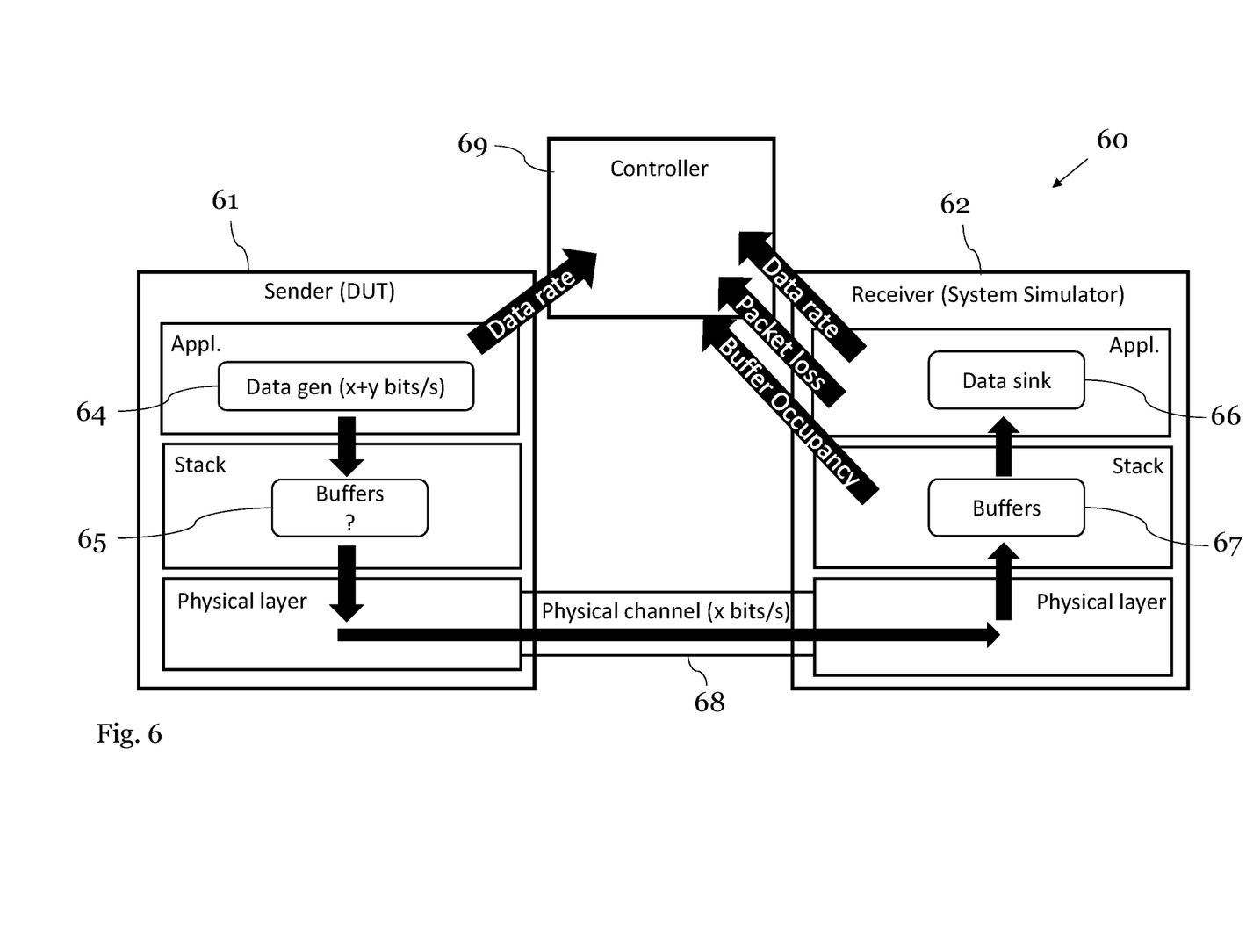
FIG. 6 shows a schematic diagram of a system for determining a buffer size of a DUT according an embodiment.

FIG. 6 shows a schematic diagram of a system 60 for determining the size of a buffer 65 of a DUT 61 according to an embodiment. The system 60 can be used to carry out the method 10 for determining the buffer size of a DUT 61 which is transmitting data.

The system 60 comprises a receiver device 62 and a control device 69. The receiver device 62 can be communicatively connected to the DUT 61 via a communication connection 68, in particular a communication channel. The DUT 61 can comprise a data generator 64 and a buffer 65, and the receiver device 62 can comprise a data sink 66 and a buffer 67. In particular, the DUT 61 can be a transmitter instance 51 as shown in FIG. 5 and the receiver device 62 can be a receiver instance 51 as shown in FIG. 5.

The system 60 can be implemented in hardware and/or software. In particular, the control device 69 can comprise a control application for controlling the measurements with the DUT 61 and/or evaluating the measurement results.

The DUT 61 can be configured to generate data at a defined data rate (e.g., according to a UDP protocol) and can transmit said data at a transmission bit rate (e.g., according to a UDP protocol) which is, for instance, slightly lower than the transmission capacities of the communication channel 68 (e.g. Iperf). In particular, the DUT 61 can be configured to transmit said data to the system 60, particularly to the control application.

The receiver device 62 can receive the data from the DUT 61 and determine the received data volume as well as the data packets or data volume which was lost during transmission, i.e. the packet loss. The receiver device 62 can be configured to forward this information to the control device 69. Furthermore, the receiver device 62 can be configured to forward an occupancy of its buffer 67 to the control device 69.

For determining the size of the buffer 65 of the DUT 61, the control device 69, in particular the control application, can be configured to implement the following procedure:

1. Generating a transmission channel 68 with certain characteristics between transmitter (here: DUT 61) and receiver (here: receiver device 62), e.g. a LTE dedicated bearer or a NR QoS flow with a certain guaranteed bit rate.

2. Determining the maximum data transfer rate between transmitter 61 and receiver 62, e.g. by means of an Iperf TCP measurement. In particular, the maximum data transfer rate can be determined according to the method 30 shown in FIG. 3.

3. Emptying the data buffers 65, 67 on the transmission path, i.e. waiting until all data has arrived at the receiver 62. This could be done, for example, by means of a signature in the last transmitted data packet.

4. Initiating a transmission of a data stream with a transmitting bit rate, wherein the transmitting bit rate exceeds the guaranteed bit rate of the transmission channel by a defined value (y Bit/s). Simultaneously measuring the received data volume, the packet losses (e.g. with an Iperf UDP measurement) and the buffer occupancies in the transfer path of the system 60, in particular the occupancy of the buffer 67 of the receiver device 62.

5. Calculating the memory levels of the DUT 61 by means of the following formula:

$$Vp = (Ts*t) - (Tr*t) - Vl - Vss$$

Hereby, Vp is the occupancy of the buffer 65 of the DUT 61 (and transmission path in the DUT 61), Ts is the generated data throughput (i.e., the average data rate of the generated data) on the transmitter side, t is the time since the start of the data generation, Tr is the received data throughput (i.e., the average data rate received on the receiver side). Thereby, the received data rate is not necessarily constant and there might be a certain variance in the received bitrate. Thus, in the above formula, the product Tr*t could be substituted by an integral for sum Z of the received data. Furthermore, Vl is the data volume of the packet loss (e.g., number of lost packets*packet size), and Vss is the used data volume in the transmission path of the system 60.

6. If the value Vp reaches saturation after a certain time of increase, the data transmission can be interrupted. The value of Vp then corresponds to the size of the buffer(s) 65 of the DUT 61, i.e. the memory volume of the DUT 61. The calculation of Vp can be carried out by the control device 69, in particular the control application.

When determining Vss, it can be taken into account that the memory levels of the system 60 may comprise additional data packets from higher OSI layers. In particular, when viewed from the application layer, the memory levels may comprise respective PDU header of the lower levels. These additional data can be removed by the control device 69 or the control application.

Figure 7:
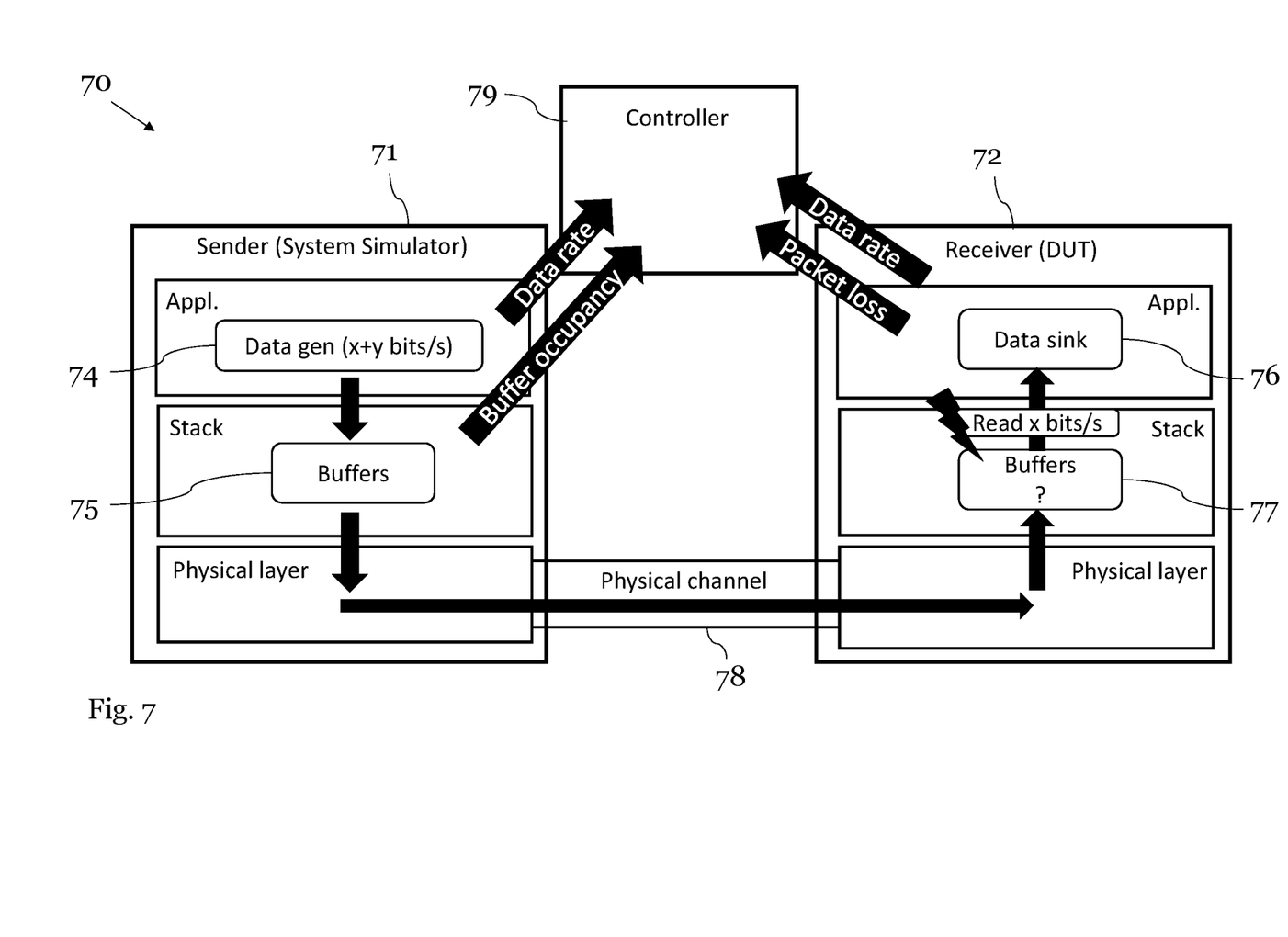
FIG. 7 shows a schematic diagram of a system for determining a buffer size of a DUT according an embodiment.

FIG. 7 shows a schematic diagram of a system 70 that operates in the opposite direction as compared to the system 60 shown in FIG. 7. The system 70 shown in FIG. 7 can be used to carry out the method 20 for determining size of the buffer 77 of the DUT 72 which is receiving data.

The system 70 shown in FIG. 7 is essentially based on the same measurement structure and the same measurement mechanism as the system 60 shown in FIG. 6. The system 70 comprises a transmitter device 71 and a control device 79. The transmitter device 71 can comprise a data generator 74 and a buffer 75, and the DUT 72 can comprise a data sink 76 and a buffer 77. In particular, the transmitter device 71 can be a transmitter instance 51 as shown in FIG. 5 and the DUT 72 can be a receiver instance 52 as shown in FIG. 5, wherein a communication channel 78 for forwarding a data stream can be established between transmitter device 71 and DUT 72. The control device 79 of system 70 can be essentially identical to the control device 69 of system 60.

If a DUT 72 is arranged on the receiver side of a data communication, problems with latency can arise if a data bottleneck occurs at the read out of its buffer 77. Such a data bottleneck at the read out can cause a filling of the buffer 77 which can in turn cause a latency in the communication. This can, for instance, occur if a CPU of the DUT 72 is under high load.

In order to determine the buffer size of the DUT 72 with the system 70, this situation can be created artificially by reducing amount of data that is read out of the buffer 77 per time unit (wait cycle) and thus creating an increase of the memory level of the buffer 77 until the buffer 77 is full. For instance, the transmitter device 71 of the system 70 can generate and transmit a data stream with a bit rate of (x+y) bits/s to the DUT 72, wherein the DUT 72 receives the data at this rate and loads the data into the buffer 77. However, the DUT 72 can be adapted such that the buffer 77 is read out at a rate of only x bits/s causing the buffer memory to fill up. In this case, the control device 79 device can then calculate the size of the buffer 77 using the same approach as described above for the system 60 in FIG. 6.

In particular, the system 60, 70 shown in FIGS. 6 and 7 can be essentially identical to the system 40 shown in FIG. 4, wherein the control device 43 corresponds to the control units 69, 79, and wherein the transceiver device 42 comprises the receiver device 62 as shown in FIG. 6 and/or the transmitter device 71 as shown in FIG. 7.

All features described above or features shown in the figures can be combined with each other in any advantageous manner within the scope of the disclosure.

The invention claimed is:

1. A method for determining a size of a buffer of a device-under-test, DUT, which is transmitting data, the method comprising:
    transmitting a data stream with a transmitting bit rate by means of the DUT, wherein the data stream is loaded into the DUT buffer during said transmission;
    receiving the data stream with a receiving bit rate at a receiver device;
    detecting a difference between the transmitting bit rate and the receiving bit rate over time;
    monitoring a packet loss at the receiver side;
    detecting a time at which a packet error rate, PER, at the receiver side increases above a threshold based on the monitored packet loss; and
    calculating a size of the DUT buffer based on a difference between an amount of data transmitted by the DUT and an amount of data received by the receiver device from the start of the transmission until the detected time of the PER increase,
    wherein the receiver device comprises a buffer, wherein the data stream is loaded into the buffer of the receiver device during reception, and
    wherein the size of the DUT buffer is calculated by:
        calculating an integral of the difference between the transmitting bit rate and the receiving bit rate from the start of the transmission until the detected time of the PER increase; and
        subtracting an occupancy of the receiver device buffer at the time of the PER increase from said integral of the difference between the transmitting and receiving bit rate.

2. The method of claim 1,
    wherein the size of the DUT buffer is further calculated by:
        additionally subtracting a data volume of a total packet loss during said time interval from said integral of the difference between the transmitting and receiving bit rate.

3. The method of claim 1, further comprising the further step of:
    emptying the DUT buffer and/or a buffer of the receiver device before initiating the transmission of the data stream.

4. The method of claim 1,
    wherein a maximum data transfer rate of a communication channel between the DUT and the receiver device is determined prior to the step of transmitting the data stream by means of the DUT.

5. The method of claim 4, wherein said determination of the maximum data transfer rate of the communication channel comprises:
    transmitting a training data stream from the DUT to the receiver device, wherein a transmitting bit rate of the training data stream is equal or higher than the maximum receiving bit rate of the receiver device.

6. The method of claim 4, wherein after the determination of the maximum data transfer rate of the communication channel, the following steps are carried out:
    emptying the DUT buffer and/or a buffer of the receiver device; and
    subsequently transmitting a data packet with a specific signature from the DUT to the receiver device to test a successful buffer emptying.

7. A method for determining a size of a buffer of a device-under-test, DUT, which is receiving data, the method comprising:
    transmitting a data stream with a transmitting bit rate by means of a transmission device;
    receiving the data stream with a receiving bit rate at the DUT, wherein the received data stream is loaded into the DUT buffer, said buffer being emptied by the DUT at a lower rate than the receiving bit rate such that the DUT buffer fills up over time;
    detecting a difference between the transmitting bit rate and the receiving bit rate over time;
    monitoring a packet loss at the receiver side;
    detecting a time at which a packet error rate, PER, at the receiver side increases above a threshold based on the monitored packet loss; and
    calculating a size of the DUT buffer based on a difference between an amount of data transmitted by the transmission device and an amount of data received by the DUT from the start of the transmission until the detected time of the PER increase,
    wherein the transmission device comprises a buffer, wherein the data stream is loaded into the buffer of the receiver device during reception, and
    wherein the size of the DUT buffer is calculated by:
        calculating an integral of the difference between the transmitting bit rate and the receiving bit rate from the start of the transmission until the detected time of the PER increase, and
        subtracting an occupancy of the transmission device buffer at the time of the PER increase from said integral of the difference between the transmitting and receiving bit rate.

8. The method of claim 7,
wherein the size of the DUT buffer is further calculated by:
additionally subtracting a data volume of a total packet loss during said time interval from said integral of the difference between the transmitting and receiving bit rate.

9. The method of claim 7,
wherein a maximum data transfer rate of a communication channel between the DUT and the transmission device is determined prior to the step of transmitting the data stream by means of the transmission device.

10. The method of claim 9, wherein said determination of the maximum data transfer rate of the communication channel comprises:
transmitting a training data stream from the transmission device to the DUT, wherein a transmitting bit rate of the training data stream is equal or higher than a maximum receiving bit rate of the DUT.

11. The method of claim 9, wherein after the determination of the maximum data transfer rate of the communication channel, the following steps are carried out:
emptying the DUT buffer and/or a buffer of the transmission device; and
subsequently transmitting a data packet with a specific signature from the transmission device to the DUT to test a successful buffer emptying.

12. A system for determining a size of a buffer of a device-under-test, DUT, comprising:
a transceiver device configured to establish a communication connection to the DUT;
wherein the transceiver device is configured to transmit a data stream to be received by the DUT or to receive a data stream that was transmitted by the DUT; wherein, in each case, the data stream is transmitted with a transmitting bit rate and received with a receiving bit rate; and wherein the data stream is loaded into the DUT buffer during reception respectively during transmission by the DUT;
a control device which is configured to detect a difference between the transmitting bit rate and the receiving bit rate over time;
wherein the control device is configured to monitor a packet loss at the receiver side, and to detect a time at which a packet error rate, PER, at the receiver side increases above a threshold based on the monitored packet loss;
wherein the control device is further configured to calculate the size of the DUT buffer based on a difference between an amount of data transmitted by the DUT respectively the transceiver device and an amount of data received by the transceiver device respectively the DUT from the start of the transmission until the detected time of the PER increase;
wherein the transceiver device comprises a transmit and a receive buffer, wherein the data stream is loaded into the transmit buffer during transmission respectively into the receive buffer during reception by the transceiver device;
wherein the control device is configured to calculate the size of the DUT buffer by:
calculating an integral of the difference between the transmitting bit rate and the receiving bit rate from the start of the transmission until the detected time of the PER increase, and
subtracting an occupancy of the transmit respective receive buffer of the transceiver device at the time of the PER increase from said integral of the difference between the transmitting and receiving bit rate.

13. The system of claim 12,
wherein the control device is further configured to calculate the size of the DUT buffer by:
additionally subtracting a data volume of a total packet loss during said time interval from said integral of the difference between the transmitting and receiving bit rate.

* * * * *